United States Patent Office 2,946,196
Patented July 26, 1960

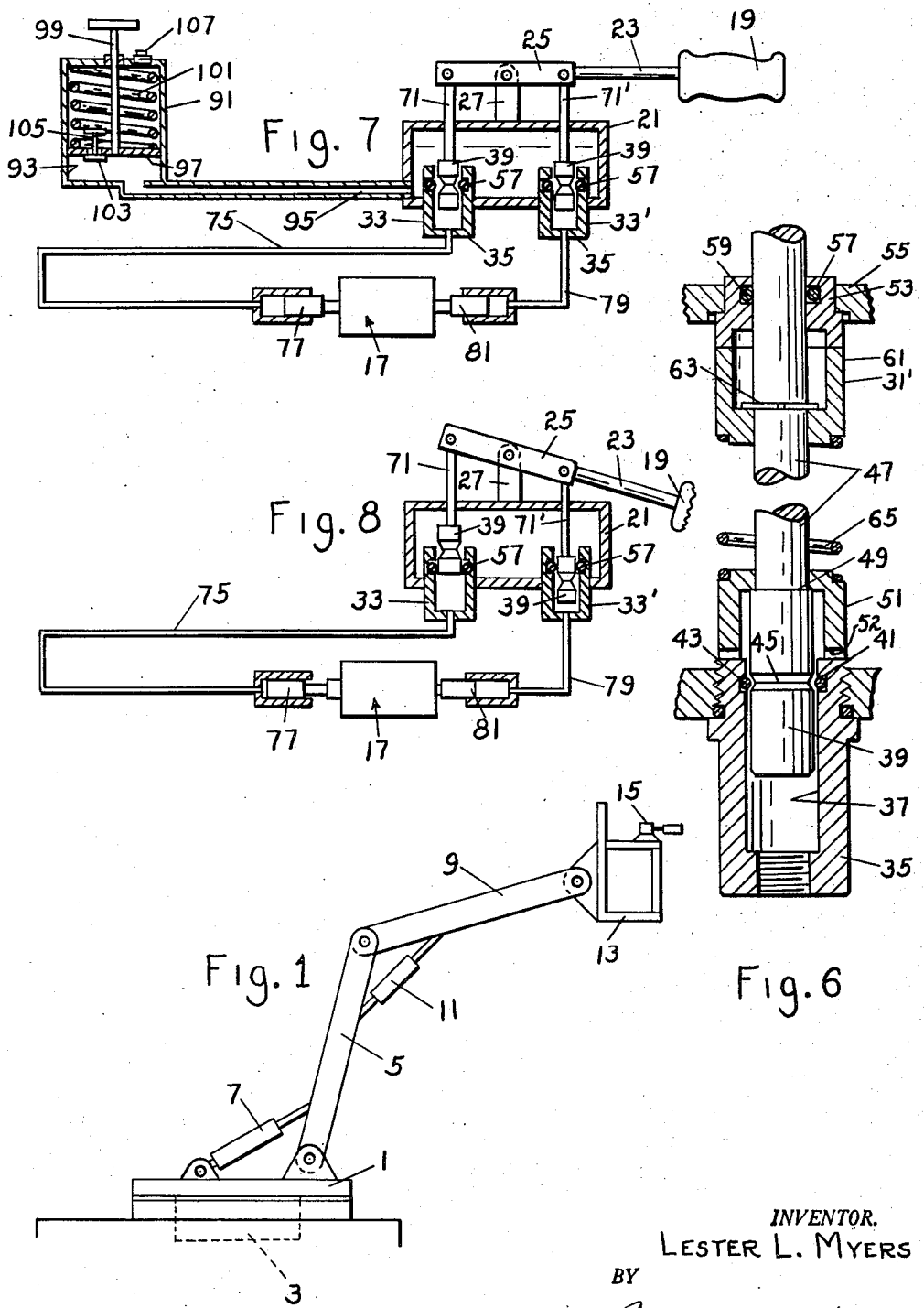

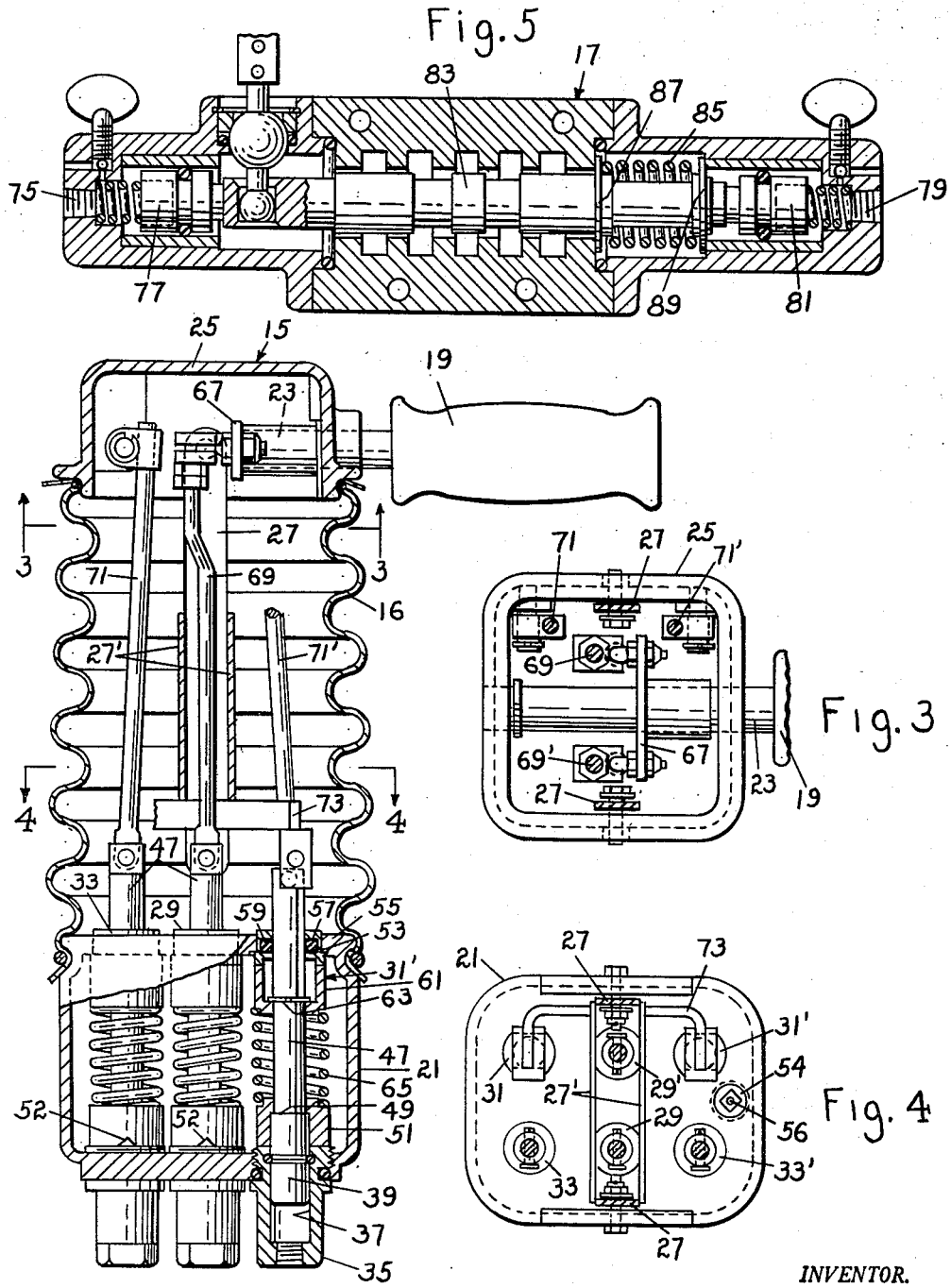

2,946,196

VALVE MECHANISM FOR CRANE CONTROLS

Lester L. Myers, Fort Wayne, Ind., assignor to Mobile Aerial Towers, Inc., Fort Wayne, Ind., a corporation of Indiana Filed Dec. 10, 1958, Ser. No. 779,455

6 Claims. (Cl. 60—54.5)

This invention relates to a valve mechanism for crane controls and is an improvement upon the structure disclosed and claimed in my Patent Number 2,836,467, issued May 27, 1958, for Crane Control Mechanism.

The mechanism disclosed in my patent utilizes manually operable pistons which are connected by hydraulic lines to follower pistons which operate the control valves to control the operation of the hydraulic motors of the crane. While provision was made therein to enable the operator to manipulate the control lever so as to admit additional liquid to or release excess liquid from the lines as required, to compensate for thermal contraction or expansion of the hydraulic fluid in lines, this required a conscious act on the part of the operator. On starting the equipment after a period of idleness, it was sometimes found that unless the operator performed this operation prior to starting the pump, the valves might not be in their neutral positions, due to the thermal contraction or expansion of the hydraulic fluid, and as a result, the crane booms or rotary table would move as soon as the pump developed pressure.

It is an object of the present invention to prevent such premature operation of the crane. To accomplish this result, provision is made for opening the hydraulic lines to the reservoir of hydraulic fluid each time the controls occupy their neutral position so that hydraulic fluid will be free to enter or leave the lines as may be dictated by thermal changes during any idle period. Since the controls are always left in the neutral position when the operator stops the crane at the end of an operation, no change in the temperature can be effective to shift the valves so as to cause the described premature movements upon starting the pump.

It is another object of the invention to provide a reciprocable control cylinder and piston which, in a predetermined neutral position, is always open but which closes when the piston is moved in either direction from said position.

A further object of the invention is to provide a combined piston and valve mechanism which will perform the described function.

Yet another object of the invention is to provide a hydraulic control system in which the manual controls, in their neutral positions connect the hydraulic lines with the hydraulic fluid reservoir.

These and other objects will become apparent from a study of this specification and the drawings which are attached hereto and form a part hereto and in which:

Figure 1 is a diagrammatic view of the crane.

Figure 2 is an elevation with parts in section showing the manual control structure.

Figure 3 is a view taken substantially on the line 3—3 of Figure 2 showing under side of the control linkage.

Figure 4 is a view taken substantially on the line 4—4 of Figure 2 showing additional control linkage.

Figure 5 is a sectional elevation showing one of the motor control valves.

Figure 6 is a sectional view of one of the combined valve and piston control units.

Figure 7 is a schematic view of one of the hydraulic systems in the neutral position.

Figure 8 is a view similar to Figure 7 but showing the system in one of its actuated positions.

Structure

Referring first to Figures 1 and 2, numeral 1 represents a turntable which is connected for right and left rotation by a rotary hydraulic motor 3. A lower boom 5 is pivotally mounted on the table and is operated by a double acting reciprocating, hydraulic motor 7. An upper boom 9 is pivotally mounted on 5 and is actuated by a double acting, reciprocating hydraulic motor 11. A pulpit 13 is mounted on the free end of boom 9 and the manual controls 15 are located usually at the right of and at a convenient height for operation by the operator who stands in the pulpit facing away from the booms.

A suitable pressure supply system which includes a motor driven pump not shown, but which is fully described in my prior patent, supplies hydraulic pressure fluid to each of the hydraulic motors under the control of the valve 17 or other controlled device such as that shown in Figure 5.

Referring to Figures 2, 3, and 4, it will be seen that there are six combined valve-piston units incorporated in the manual control mechanism. These will be referred to hereinafter as pilot units.

The handle 19 which is manipulated by the operator, is mounted on the reservoir 21, which is fixed to the pulpit, so that it may be moved in opposite directions and in three distinct ways. It may be rotated right and left about its horizontal axis and the first hydraulic control system will move the valve 17 corresponding thereto to energize the rotary motor 3 so that the latter will rotate right and left, correspondingly, about its vertical axis, when viewed from above.

The handle may be moved fore and aft in a translating motion and the second control system will operate the corresponding valve 17 of the motor 7 so that the latter will pivot the lower boom fore and aft. Finally the handle may be tilted up and down and the third control system will adjust the valve 17 for the motor 11 so that the upper boom will be raised or lowered.

The shaft 23 of the handle is rotatably mounted in a cap 25 which is in turn centrally pivoted on the upper ends of links 27 which are rigidly connected together by plates 27' and are pivoted on the reservoir.

Six pilot units 29, 29', 31, 31', 33, and 33' are mounted in the reservoir. One unit 31' for example, will be described. It comprises a cylinder element 35 which is screwed into the bottom of the reservoir and has a bore 37 which receives the piston element or plunger 39 and defining therewith a working chamber. The bore has an annular groove 41 adjacent its upper end in which an O-ring seal 43 is disposed. The central portion of the piston has an annular V-groove 45. The piston fits the bore loosely but is sealed off by the seal 43 except when the V-groove lies adjacent the seal, which is the neutral position of the unit. In this position, fluid may flow past the seal to or from the reservoir.

The piston has a stem 47 of reduced diameter forming a shoulder 49 with the piston. A substantially tubular spring seat 51 rests at its upper end on the shoulder and at its lower end of the cylinder, when the piston is located in its neutral position. The spring seat has ports 52 to permit fluid to flow betwen the cylinder and reservoir.

A guide 53 for the stem 47 is fitted in an opening in the cover portion 55 of the reservoir. The bore of the guide has an annular groove 57 which receives an O-ring seal 59 which sealingly engages the stem. The cover is provided with a plug 54 (Fig. 4) which is provided with a vent opening 56.

A spring seat 61 which is similar to 51 rests on the lower end of the guide and also engages a snap ring 63 which is mounted in a groove on the stem, inside the seat, when the plunger is in its neutral position. The neutralizing spring 65 rests on the seats and urges them in opposite directions.

Thus as the stem 47 is lifted, the lower spring seat 51 will be lifted from the cylinder and the spring will be compressed. If the stem is released, the spring will return the piston to its neutral position. When the stem is depressed, the snap ring 63 will move the upper spring seat away from the guide, compressing the spring. Again when the piston is released, the spring will move the piston to its neutral position.

The shaft 23 of the handle carries a cross-bar 67 and the ends thereof are connected by links 69, 69' to the stems of pistons 29, 29' respectively. Additional rods 71, 71' connect the cap 15 on opposite sides of the axis of the pivots for links 27 to the pistons of units 33 and 33' respectively.

A U-shaped cross-bar 73 is fixed to and transversely of one of the links 27 adjacent the lower end thereof and the ends of the bar are connected to the piston stems of the units 31 and 31' respectively. An accordion-like boot 16 is fastened at one end to cap 25 and at the other end to the upper part of the reservoir to enclose the linkage of the control mechanism.

Thus as the handle 19 is rotated from the neutral position, one of the pistons 29, 29' will be raised and the other will be depressed. Similarly, as the handle is moved fore and aft from the neutral position, one or the other of the pistons of units 31, 31' will be raised and the other depressed. Likewise, tilting the handle up or down from the neutral position will move the piston of one of the units 33, 33' up and the other down.

These movements may be executed simultaneously in any combination by a skilled operator to position the pulpit where he wants it.

Referring to Figures 7 and 8 which illustrate the hydraulic control system for the valve of the upper boom. The cylinder of unit 33 is connected by a tube 75 to the follower piston 77 of the valve 17 for the motor 11. The cylinder of the other unit 33' is connected by a tube 79 to the opposing follower piston 81 of the valve.

The pistons 77, 81 (Figure 5) are usually integral with the piston valve member 83 and operate in the valve body. These pistons and cylinders constitute fluid motors. A centering spring 85 acts on flanges 87, 89 to urge the valve 83 to its central or neutral position in which the flow of pressure fluid to or from either end of the motor 11 is prevented.

In the neutral position of the handle as shown in Figure 7, hydraulic fluid can pass to or from the reservoir so that thermal expansion or contraction of the hydraulic fluid in the lines 75, 79 or the cylinders of pistons 77, 81 cannot exert any pressure on the pistons 77, 81 to displace the valve.

When the lever is tilted downwardly as shown in Figure 8, the lower and upper parts of the pistons 39 of units 33, 33' are respectively sealed off by the O-rings 57, so that liquid will be forced into line 79 from cylinder 33' to move piston 81 to the left. The liquid displaced by the other piston 77 is forced thereby through line 75 to the cylinder of unit 33.

The valve 83 is therefore moved to the left (Figure 5) and will connect the pump pressure to the upper end of the motor and the lower end of the motor to exhaust. The upper boom will tilt downwardly and will continue to move until the handle 19 is raised to its neutral position. As noted above, this can be accomplished by simply releasing the handle so that the springs 65 will do this.

The other pairs of units 29, 29' and 31, 31' are similarly connected to corresponding valves 17 for the other motors 3 and 7 and operate in the same manner as the system just described.

*Modification*

In the event that the boom 9 is made longer than about forty feet, the vent plug 54 must be replaced with a solid plug to prevent the leakage of the fluid from the system when the boom is in a vertical position.

In order to permit flow of liquid between the various cylinders and the reservoir to compensate for thermal expansion and contraction as described, an accumulator shown in Figure 7 is provided.

It comprises a body 91 having a cylindrical bore 93 which is connected at its bottom with the reservoir through a tube 95. A piston 97 is slidable in the bore and has a rod 99 which passes sealingly through the top of the container. A spring 101 urges the piston downwardly to force liquid from the cylinder through the tube 95 to the reservoir.

A check valve 103 or similar device is installed in the piston which is held closed by a spring 105. The valve opens in a direction to permit fluid to flow downwardly through the piston but is closed by the spring to prevent a reverse flow.

A fill plug 107 is provided through which liquid may be introduced into the cylinder above the piston.

When the handle is in a lower position which indicates that more oil is needed, the plug 107 is removed, fluid is poured into the cylinder and the plug is replaced. The handle is then lifted to force oil through the check valve and into the lower part of the cylinder. When the handle is released, the spring urges the piston downwardly to pressurize the fluid in the reservoir 21.

It is obvious that various changes may be made in the form, structure and arrangement of parts without departing from the spirit of the invention. Accordingly, applicant does not desire to be limited to the specific embodiment disclosed herein primarily for purposes of illustration, but instead, he desires protection falling fairly within the scope of the appended claims.

I claim:

1. In a position control system, the combination of a controlled device having a member mounted for movement between a neutral position and either of two limit positions on opposite sides of said neutral position, yieldable means for urging said member towards and holding it in said neutral position, a first fluid motor connected to move said member toward one limit position, a second fluid motor connected to move said member toward the other limit position, separate means for actuating each of said fluid motors, said means each comprising a cylinder element having an inlet and an outlet, a piston element disposed for reciprocation in said cylinder and loosely fitted therein, a seal mounted on one of said elements and extending into sealing engagement with the other element to define therewith a working chamber between said seal and said outlet, said other element defining a groove, disposed for alignment with said sealing means when said piston occupies a predetermined position in said cylinder, said groove having a width and depth sufficient to render said seal ineffective, a tube connecting said outlet with one of said fluid motors, a reservoir for fluid, means connecting the inlet of each cylinder element to said reservoir, a handle mounted for movement in either of two directions from an intermediate position, means connecting said piston elements with said handle for reciprocation thereby in opposite directions when said handle is moved in either directon, the respective piston and cylinder elements being disposed in their predetermined positions when said handle occupies said intermediate position so as to connect said reservor simultaneously in communication with the working chambers, tubes and fluid motors.

2. The structure defined by claim 1 which includes resilient means for moving said piston elements to and holding them in said predetermined positions.

3. The structure defined by claim 1 wherein said one element defines an annular groove, said seal comprises a toroid of yieldable, resilient material and said seal occupies said annular groove.

4. The structure defined by claim 1 wherein said groove defined by said other element has a V-shaped cross-section, said seal is a toroid, said ring and groove occupying co-planar positions when said cylinder and piston elements occupy their predetermined positions.

5. The structure defined by claim 4 wherein said one element is the cylinder element and said other element is the piston element.

6. The structure defined by claim 1 wherein said reservoir comprises a closed pressure chamber, having an inlet, means for pressurizing said reservoir comprising a cylinder, having an inlet and an outlet, a piston sealingly mounted in said cylinder for reciprocation therein, a spring in said cylinder acting on said piston to urge it toward said outlet, manually operable means for moving said piston toward said inlet, a conduit connecting opposite ends of said cylinder and a check valve in said conduit disposed so as to prevent flow from said outlet to said inlet end of said cylinder, removable means for closing said inlet and a tube connecting the outlet of said cylinder with the inlet of said reservoir.

References Cited in the file of this patent

UNITED STATES PATENTS

| | | |
|---|---|---|
| 2,179,201 | Scott | Nov. 7, 1939 |
| 2,196,930 | Loweke | Apr. 9, 1940 |
| 2,243,385 | Levy | May 27, 1941 |
| 2,383,180 | Ellinwood | Aug. 21, 1945 |
| 2,417,232 | Bohall et al. | Mar. 11, 1947 |
| 2,561,009 | Byers et al. | July 17, 1951 |
| 2,737,021 | Edge et al. | Mar. 6, 1956 |

FOREIGN PATENTS

| | | |
|---|---|---|
| 495,751 | Great Britain | Nov. 18, 1938 |